United States Patent [19]

Doremus et al.

[11] 4,121,088

[45] Oct. 17, 1978

[54] ELECTRICALLY HEATED AIR DATA SENSING DEVICE

[75] Inventors: John A. Doremus, Wayzata; William R. Kirkpatrick, Faribault, both of Minn.

[73] Assignee: Rosemount Inc., Minneapolis, Minn.

[21] Appl. No.: 733,048

[22] Filed: Oct. 18, 1976

[51] Int. Cl.² .................... H05B 3/02; G01W 1/10; H01C 7/02

[52] U.S. Cl. .................................. 219/201; 73/188; 73/212; 219/505; 219/536; 219/539; 219/541; 338/22 R; 338/295; 338/328; 338/329

[58] Field of Search ............... 219/200, 201, 301, 504, 219/505, 536, 539, 541; 338/328, 329, 22 R, 23, 295; 73/188, 212; 361/306

[56] References Cited

U.S. PATENT DOCUMENTS

| | | | |
|---|---|---|---|
| 2,399,370 | 4/1946 | McOrlly | 73/212 |
| 2,582,931 | 1/1952 | Kodama | 361/306 |
| 3,338,476 | 8/1967 | Marcoux | 219/505 X |
| 3,375,774 | 4/1968 | Fujimura et al. | 219/505 UX |
| 3,488,470 | 1/1970 | Weaver | 73/212 X |
| 3,535,930 | 10/1970 | Rees | 73/212 |
| 3,582,968 | 6/1971 | Buiting | 219/541 X |
| 3,662,149 | 5/1972 | Lipinski | 219/201 |
| 3,748,439 | 7/1973 | Ting et al. | 219/505 X |
| 3,824,328 | 7/1974 | Ting et al. | 338/22 R |
| 3,882,721 | 5/1975 | Neary et al. | 73/188 |
| 4,000,647 | 1/1977 | Tauchmann | 219/201 X |

FOREIGN PATENT DOCUMENTS

2,504,237  8/1976  Fed. Rep. of Germany ........... 219/222

Primary Examiner—A. Bartis
Attorney, Agent, or Firm—Kinney, Lange, Westman & Fairbairn

[57] ABSTRACT

A positive temperature coefficient (PTC) resistance heater assembly is used in combination with an angle of attack vane to provide automatic means for maintaining the temperature of the vane at a level which will de-ice the vane. The heater assembly is embedded in a recess in the vane and is made up of a plurality of individual PTC resistors connected electrically and mechanically in parallel by flexible electrically conductive perforated strips which permit the individual resistors to move relative to each the other under thermal stress and which also permit the encapsulation of the resistors in a suitable thermally conductive, electrically oinsulative material that is sufficiently resilient to permit the individual resistors to expand and contract relative to the vane during use.

12 Claims, 4 Drawing Figures

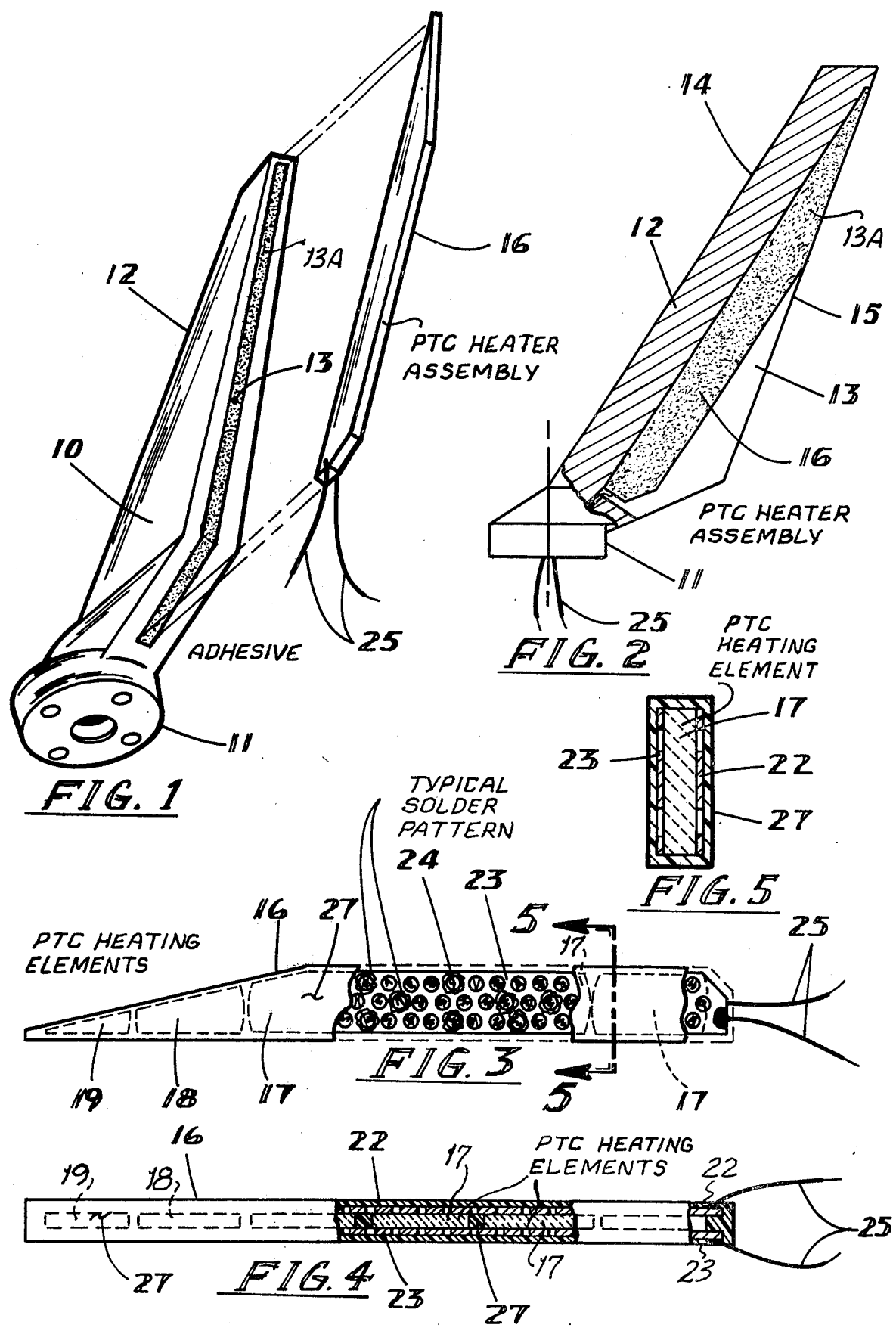

ELECTRICALLY HEATED AIR DATA SENSING DEVICE

BACKGROUND OF THE INVENTION

1. Field of the Invention

The present invention relates to heated air data sensors and in particular to sensors which use PTC resistance material for such heaters.

2. Prior Art

In the prior art the use of positive temperature coefficient resistance material for heating various devices has been disclosed. British Patent Specification No. 1,371,709 shows a pressure head for air data sensors having a heater element or elements made of a PTC resistance material. As disclosed the material has a low level electrical resistance until it reaches a given temperature called the anomaly (or Curie) temperature and then the resistance rises substantially when that temperature is reached. The pressure head is de-iced with toroidal or tubular ring type heaters mounted inside the pressure head with the outer peripheral surfaces of the heaters against the inside wall of the body of the pressure head. Difficulties are encountered in this type of device from the manufacturing of the heater elements in the proper shape and the close tolerance required, and also there are problems of installation which limit the effectiveness of the thermal conduction between the heater and the wall of the probe.

Other applications of such PTC resistor heaters include the use in a windshield wiper blade, shown in U.S. Pat. No. 3,489,884, and also as a heating device for use with aerosol containers as shown in U.S. Pat. No. 3,338,476. A fully automatic coffee pot using a PTC resistor heater is shown in U.S. Pat. No. 3,375,774.

One important PTC material used at the present time is doped barium titanate, a material whose positive temperature coefficient properties have long been recognized. Any heater installation in an air data sensing vane must be in good thermal contact with the vane and at the same time electrically insulated from the vane. Various encapsulating materials have been used with PTC elements. For example, U.S. Pat. No. 3,824,328 indicates that a capsulation material can include silicone resins, polyamides and polyimides, and then external epoxy can be used for potting on the outside of the initial layer. A PTC resistor package is also shown in U.S. Pat. No. 3,835,434. Bonding of heating elements to a structure is illustrated in U.S. Pat. No. 3,898,422.

PTC materials have been used in other applications, such as motor starting apparatus, degaussing systems for color television tubes, and also in various current limiting applications.

SUMMARY OF THE INVENTION

The present invention relates to the use of a positive temperature coefficient resistor material as a de-icing heater assembly of an air data sensor. The heater assembly is embedded in the sensor body. The heater assembly is made up of a plurality of individual heater resistors in the form of chips connected in parallel through flexible electrically conductive connectors permitting the individual chips to move slightly relative to each other, and which also permit encapsulating the chips in a suitable temperature conductive, electrically insulating material that is sufficiently resilient to permit the individual chips to expand and contract relative to the air data sensing device during use. There is a substantial ambient temperature range during use of air data sensors, and thus thermally induced dimensional changes are substantial. Also, different coefficients of expansion of the PTC material and the sensor material must be accommodated. Ordinary resistance wire heaters can reach an exceedingly high temperature in air data sensors when the aircraft is taxiing or is standing if the heater is large enough to supply the required amount of heat during operational conditions. The PTC resistance heaters regulate the temperature of the air data sensing device automatically, and keep the temperature at a level low enough to prevent structural degradation of the probe or air data sensing device.

The PTC resistor material used in the present device is doped barium titanate, a well known ceramic material that has displayed positive temperature coefficient properties, and is used widely in other applications.

BRIEF DESCRIPTION OF THE DRAWINGS

FIG. 1 is a perspective exploded view illustrating a typical air data sensing device, in this form of the invention a vane sensor, in a partially manufactured stage and illustrates a PTC heater assembly that will be inserted into the vane;

FIG. 2 is a sectional view longitudinally along the vane of FIG. 1 illustrating the cavity for the PTC heater with the heater installed and in place;

FIG. 3 is a plan view of the heater assembly with parts broken away;

FIG. 4 is a side view of the heater assembly of FIG. 3 with parts in section and parts broken away; and FIG. 5 is a sectional view taken on line 5—5 in FIG. 3.

DESCRIPTION OF THE PREFERRED EMBODIMENT

In the form of the invention disclosed, the air data sensor utilized is a swept vane angle of attack sensor. A typical vane sensor is illustrated in U.S. Pat. No. 3,882,721 issued May 13, 1975. The vane illustrated in the present device is shown without any mounting details, and reference can be made to the mounting details of this patent and also for an explanation of operation. In U.S. Pat. No. 3,882,721, a wire type heater is illustrated.

Referring to FIG. 1, the air data sensing device illustrated generally at 10 as stated comprises a probe which as shown is an enlarged swept vane that is mounted for pivotal movement, which mounting device is not shown, in a conventional manner through the use of mounting disc 11 at its base end. The vane 12 is attached to the mounting disc, and as can be seen the mounting disc in turn will be mounted to the suitable mounting structure as shown in U.S. Pat. No. 3,882,721. The vane is external of the aircraft in the fluid stream and is used for sensing angle of attack of the aircraft. As such it must be deiced for operation and the heater used must dissipate sufficient power to melt ice at high airflow rates past the vane or sensor and at the same time it is desirable to limit the maximum temperature to which the sensor is subjected.

In the present device, the vane 12 as shown has a suitable slot 13 formed therein which slot opens to the trailing edge of the vane. It can be seen perhaps best in FIG. 2 that the leading edge indicated at 14 is swept rearwardly from the central mounting or pivotal axis of the disc 11, and the trailing edge of the vane is swept rearwardly as well, but at a different angle than the forward edge 14. The trailing edge is illustrated at 15.

The slot 13 in the vane is used for mouting a heater assembly illustrated at 16. In this form of the invention the heater assembly is made up of a plurality of individual positive temperature coefficient resistor material elements. The makeup of the heater assembly 16 is shown perhaps best in FIGS. 3 and 4, where individual elements indicated at 17 in the main part of the heater are formed in a standard shape, and the elements 18 and 19 out near the tapered end of the heater assembly 16 are formed in a desired shape to fill the narrowed slot portion at the outer end of the vane.

In the form shown, the heater elements such as 17, 18 and 19 are flat chip elements formed so that they are substantially uniform thickness. The elements are coated with conductive material on the flat surfaces and are electrically connected in parallel through the use of top and bottom electrical connector strips illustrated at 22 and 23, respectively. These connector strips in the form shown have a plurality of apertures 24. The strips are made of an electrically conductive, solderable material such as berylium copper.

The chip heater elements 17, 18 and 19 and the connecting strips 22 and 23 are soldered together. The apertures 24 aid in permitting solder to flow down to contact the surfaces of the elements 17, 18 and 19. In manufacture of positive temperature coefficient resistor elements, the flat surfaces are metalized with silver or the like, and the strips 22 and 23 are soldered to the silver layer. Care must be taken in the soldering operation to avoid damaging the heater elements, and it has been found that when using normal soldering techniques with suitable flux and solder composition, solder has been adequate for not only electrically bonding the strips 22 and 23 to the elements, but also physically bonding them with sufficient strength to withstand the rigors of use in an air data sensing device. Solder therefore comprises an electrically conductive bonding means between the strips and the PTC elements.

Suitable electrical leads indicated at 25 are attached to each of the strips 22 and 23, in a desired location and of a desired length. These leads are run out through an aperture in the disc 11 during assembly, and will connect to a power source and controls inside the aircraft.

After soldering it has been found desirable to place the subassembly of the heater elements 17, 18 and 19, and strips 22 and 23 in an oven to drive off any solvents that may have been absorbed by the heater element material. Subsequently, the subassembly of the strips and elements are placed into a suitable mold and supported in a desired manner and then suitable potting or encapsulating material is placed around the subassembly. This material indicated at 27 is material that is flexible enough to accommodate thermally caused dimensional change, is thermally conductive to conduct heat from the elements 17, 18 and 19 to the vane at a desired rate and the material must not contain any material that degrades the resistance element material. It has been found that a silicone rubber material has exhibited satisfactory characteristics in this regard, and as can be seen in FIGS. 4 and 5, this layer of material 27 surrounds the entire subassembly, and the potting or encapsulating material enters the cavities between the adjacent ends of the heater elements 17, 18 and 19.

The assembly 16 is molded to a size to slip into the slot 13 in the vane 12. The internal slot surfaces 13 in the vane 12 are coated with a liquid or flowable silicone rubber material, indicated by stripping 13A, (which acts as a cement or bonding agent) with a sufficient amount being used so that there is an excess. Then the assembly 16, which comprises the heater elements, connecting strips 22 and 23, and the surrounding material 27, is forced into the slot 13. The excess cement or liquid silicone rubber is forced out of the slot to remove any air pockets, and to provide a prescribed thermal transmission with the probe itself. When the liquid silicone rubber has dried, excess drips or flashing can be removed and the back opening of the slot of the vane is closed. This is normally done with a cover strip or plate, which is not shown, and epoxy can be used to hermetically seal the slot opening.

The leads 25,25 are threaded through the provided openings in disc 11 before the main portion of the heater assembly 16 is placed into the cavity 13.

The PTC heater elements themselves are selected so that they will have a high enough initial resistance to prevent excessive surge currents when the heater is first turned on, and yet will have an anomaly temperature that is below the annealing temperature of the aluminum from which the air data sensing devices are normally made. In still air, therefore, the heater assembly temperature will increase to its anomaly temperature, the resistance will rise sharply, and temperature of the vane will stablize at a desired level.

In operation, when the sensor or vane is being subjected to high airflows, and to ice, the sensor will tend to cool, causing the resistance of the PTC elements to drop, and therefore causing higher power consumption, sufficient to melt the ice that otherwise would form.

PTC resistor heaters are available in a wide range of anomaly temperatures. Thus selection of the temperature at which operation is desired can be made with ease.

The electrical insulation material 27 should have high electrical resistivity, high voltage breakdown, high thermal conductivity and flexibility so that no excessive strains on the elements or chips are caused by differences in thermal expansion between the heater assembly and the vane. The flexible strips also flex so the chips can flex slightly relative to the strips and each other, under thermally induced expansion and contraction, as well. It also should be noted that the thermal conductivity of material 27 should not be too great, or in other words the elements 17, 18 and 19 should not be in extremely close thermal conductivity with the vane material because the thermal gradient from the center of the heater elements to the outside surfaces of the elements could then be great enough to cause fracture of the PTC resistor element.

It is to be understood that the vane shown is merely an example of use and other air data sensors can use the same type of heater assembly.

What is claimed is:

1. In an air data sensor for an aircraft having deicing heaters installed in the sensor in a position to heat the sensor to prevent icing, wherein said deicing heaters comprise a plurality of PTC heater elements, flexible strip means bonded to the electrically connecting said PTC heater elements in parallel to form a PTC heater assembly, means comprising a flexible, electrically insulating, thermally conductive material embedding said PTC heater assembly, and means to mount the embedded PTC heater assembly on an air data sensor with the thermally conductive material positioned between the PTC heater assembly and adjacent surfaces of the air data sensor and in heat transfer relationship thereto, said flexible strip means being sufficiently flexible to permit the individual PTC heater elements to shift relative to each other under thermal gradients.

2. The combination as specified in claim 1 wherein said flexible strip means comprises at least one generally flat strip of electrically conductive metal having performations therethrough, and flowable electrically conductive bonding material bonding the strip means and PTC elements electrically and mechanically.

3. The combination as specified in claim 1, wherein said air data sensor comprises a vane having an elongated direction, means forming a groove in said vane along substantially the entire exposed length of the vane, said PTC heater assembly extending along the groove and being mounted in said groove.

4. The combination as specified in claim 1 wherein said plurality of said PTC heater elements are arranged in end to end relationship, said PTC heater elements lying generally on a common plane on one side thereof, said flexible strip means comprising a separate electrically conductive strip attached to each of the PTC heater elements electrically and mechanically on opposite sides of said PTC heater elements.

5. The combination as specified in claim 4 wherein said means comprising an insulating thermally conductive material comprises an encapsulating covering over said electrically conductive strips and said PTC heater elements.

6. The combination as specified in claim 5 wherein said encapsulating covering is a silicone rubber.

7. An air data sensor including a portion exposed to a variable temperature and velocity fluid stream, a heater for said exposed portion comprising a plurality of PTC resistor heaters, a common flexible electrically conductive strip means connecting all of said PTC resistor heaters electrically and mechanically in parallel, a covering of thermally conductive, electrically insulating material over said PTC resistor heaters and said flexible strip means, said covering being in thermal contact with portions of said exposed portion, said flexible conductive strip means being sufficiently flexible to permit the PTC resistor heaters to shift relative to each other under thermally induced expansion.

8. The air data sensor of claim 7 wherein said flexible conductive strip means have a plurality of perforations therethrough.

9. The method of making an electrically heated air data sensor or the like having a portion exposed to a fluid stream comprising connecting a plurality of individual PTC resistor elements in parallel by bonding the PTC resistor elements to flexible electrically conductive strip means to form an assembly, said strip means being sufficiently flexible to permit the elements to flex relative to each other under thermal gradients, encapsulating the elements and connected strip means assembly with flexible electrically insulating thermally conductive material, and mounting the encapsulated assembly in an air data sensor in position to be in heat conductive relationship to the portion of the air data sensor exposed to a fluid stream.

10. The method of claim 9 including the further step of providing an externally opening recess in the air data sensor for receiving the encapsulated assembly, and applying a liquid cement to the mating surfaces of said receptacle and encapsulated assembly, and inserting the encapsulated assembly into said recess.

11. The method of claim 9 wherein the step of connecting said PTC resistor elements together in parallel by flexible strip means includes the step of providing strips of material having perforations therethrough and spanning all of the PTC resistor elements, and soldering such strips to opposite sides of said PTC resistor elements in a sandwich construction whereby the solder engages the PTC resistor elements and extends into at least some of the perforations of said strips.

12. An electrically heated air data sensing device comprising a movable vane having an elongated portion exposed to a variable temperature fluid, means defining a groove in said vane along substantially the entire exposed portion of the vane, and a heater assembly mounted in and extending along the groove, said heater assembly comprising a plurality of individual PTC heater elements arranged in end to end relationship, said PTC heater elements each having oppositely facing side surfaces, the respective oppositely facing side surfaces of adjacent PTC elements lying along generally parallel common plane, a pair of separate generally flat flexible electrically conductive strips having a plurality of perforations therethrough, electrically conductive bonding means bonding each of the PTC heater elements electrically and mechanically to both of said strips, said strips being sufficiently flexible to permit said PTC elements to shift relative to each other during thermal expansion and contraction, and a flexible, thermally conductive electrically insulating material encapsulating said strips and PTC elements.

* * * * *

UNITED STATES PATENT OFFICE
CERTIFICATE OF CORRECTION

Patent No. 4,121,088      Dated October 17, 1978

Inventor(s) John A. Doremus and William R. Kirkpatrick

It is certified that error appears in the above-identified patent and that said Letters Patent are hereby corrected as shown below:

Column 4, line 61 (Claim 1, line 5) "the" should be --and-- .

Signed and Sealed this

Thirteenth Day of February 1979

[SEAL]

Attest:

RUTH C. MASON
*Attesting Officer*

DONALD W. BANNER
*Commissioner of Patents and Trademarks*